United States Patent [19]

Stump

[11] Patent Number: 5,800,105
[45] Date of Patent: Sep. 1, 1998

[54] VEHICLE TIE-DOWN MECHANISM

[76] Inventor: Kenneth Troy Stump, 7011 Candlelight Cir., Huntington Beach, Calif. 92647

[21] Appl. No.: 697,585

[22] Filed: Aug. 27, 1996

[51] Int. Cl.$^6$ .................................................. B60P 7/08
[52] U.S. Cl. .................... 410/103; 410/100; 410/101; 410/106; 242/394; 242/611.1
[58] Field of Search ........................ 410/12, 100, 103, 410/97, 101, 106; 242/394, 611.1, 396.1; 254/365, 375, 243; 24/680 CD

[56] References Cited

U.S. PATENT DOCUMENTS

| 2,135,857 | 11/1938 | Stahl | 410/4 X |
| 2,738,204 | 3/1956 | Ibey | 410/103 X |
| 2,946,563 | 7/1960 | Eaton | 410/103 X |
| 3,428,331 | 2/1969 | Morgan et al. | 410/100 |
| 4,382,736 | 5/1983 | Thomas | 410/103 X |
| 5,433,565 | 7/1995 | Chan | 410/103 |
| 5,441,371 | 8/1995 | Erke | 410/100 |

*Primary Examiner*—Stephen T. Gordon
*Attorney, Agent, or Firm*—Curtis L. Harrington

[57] ABSTRACT

A tie-down mechanism has a spool portion which is operable by manual engagement with a pivoting handle which engages a spool portion at selected angular positions and is used to provide additional force to turn the spool. At the opposite end of the spool, a spring loaded locking pin is manually disengaged to enable the spool to turn and take up a webbed strap, cord or rope which is being engaged. As the handle is moved downward to its maximum extent, the pin is allowed to engage and lock the spool as the handle is re-positioned for a further pull. The spool can be disengaged only by manual operation of the locking pin, and the locking pin cannot be removed while the spool is under turning force. In addition, the tie-down mechanism of the present invention is fitted with a special plate and locking mechanism which enables it to pivot without becoming disengaged from a vehicle body, and provides for a locking mechanism to deter theft.

10 Claims, 4 Drawing Sheets

VEHICLE TIE-DOWN MECHANISM

FIELD OF THE INVENTION

The present invention relates to the field of tie down mechanisms and more particularly to an attractive mechanism which can be detached from a vehicle and assists in locking down the securing banding on a vehicle.

BACKGROUND OF THE INVENTION

A number of mechanisms are available to assist in tying down securing strapping, including rope, cord or webbed strapping, especially on a vehicle. At the simplest are tie-down horns extending from a vehicle. Customization of the tie downs have resulted in structures which blend in with the vehicle's body or which have a low profile, yet have acceptable area for securing enough ropes or straps. The disadvantages of these structures are the same disadvantages for all static tie down structures in that most of the tie down forces are generated directly by the user while trying to tie the structure at the same time.

At the other end of the spectrum are the ratcheted tie downs which use a ratchet tooth and spring loaded catch mechanism. These devices are heavy duty flange ends which support a hollow tube. The hollow take-up tube supports thru-hole at each end of the tube through which a tool, such as a heavy screw driver or tire iron can be inserted and used as a lever. As the user tightens the device, a spring loaded catch clicks as it catches each tooth of the ratchet as the device is tightened. During the unload procedure, the catch is removed and the take-up tube spins free under the influence of the forces from the strap. This release can be dangerous especially when significant forces are built up in the strapping.

Thus far there have been no acceptable mechanisms for use with a light truck or the American pickup truck. Prior designs for the light truck include the smaller tie hooks. In the light truck market, attention must be paid not only to the functionality of any structures incorporated, but also to the appearance of the appliance. A large unsightly rachet mechanism such as are used on larger trucks is unacceptable for use in the smaller light trucks.

The use of a light truck mechanism which is small and attractive also invites theft. Any small, attractive mechanism used for a light truck should be lockable. The lockability must accommodate the fact that the mechanism will be located externally with respect to the truck body and will be completely accessible to potential thiefs.

Further, the mechanism needed for light trucks should be relatively safe and not be amenable to a total release which could harm the user. It is preferable for a release mechanism to encourage a slow, deliberate release. This prevents injury to the user and in addition helps to protect the load as it is being unsecured.

SUMMARY OF THE INVENTION

The tie-down mechanism of the present invention has a spool portion which is operable by engagement with a pivoting handle. The pivoting handle engages the spool portion at selected angular positions and is used to provide additional force to turn the spool. At the opposite end of the spool, a spring loaded locking pin is manually disengaged to enable the spool to turn and take up a webbed strap, cord or rope which is being engaged.

As the handle is moved downward to its maximum extent, the pin is allowed to engage and lock the spool as the handle is re-positioned for a further pull. The spool can be disengaged only by manual operation of the locking pin, and the locking pin cannot be removed while the spool is under pressure. This means that the user must have the spool engaged with the pivoting handle in order to disengage the spool. As the spool is allowed to angularly turn accompanied by movement of the handle, the handle can be disengaged only after the spool is locked with the spring loaded locking pin.

This arrangement provides for an orderly stepwise procedure on tightening of the tie-down mechanism which stepwise procedure is performed in reverse order on the release of the rope or cord secured by the tie-down mechanism. The result is the elimination of a free-flying rope or tie-down strap during the loosening and disengagement of the tie-down mechanism.

In addition, the tie-down mechanism of the present invention is fitted with a special plate and locking mechanism which enables it to pivot without becoming disengaged from the vehicle body. In the majority of tie-downs, the strap will be oriented at an angle other than completely vertical. Therefore the ability of the tie-down mechanism to pivot to another direction is useful and eliminates wear on the strap or rope from the edge of the mechanism.

A single stud is used to rotatably engage the tie-down mechanism onto the body of a vehicle. A special locking plate is provided which fits over the single stud, and which has an aperture for engaging a locking pin. The locking pin is engaged through an aperture in the locking plate and a similar aperture in the body of the vehicle. The bottom of the locking pin has a bore extending transverse to the length of the locking pin which can be engaged with a small padlock or other similar locking mechanism.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
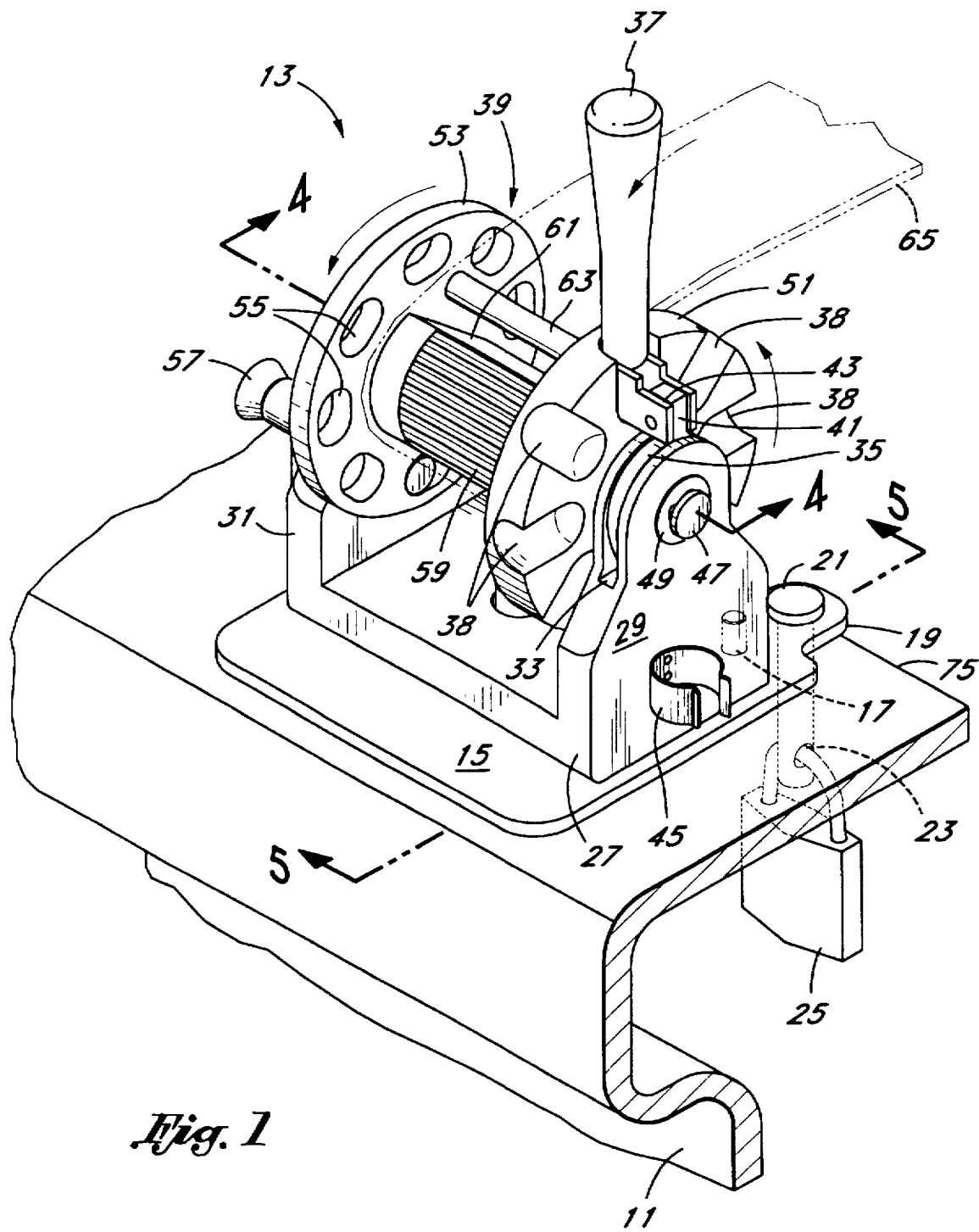
FIG. 1 is a perspective view of the tie-down mechanism shown in position on a section the body of a vehicle.

The description and operation of the invention will be best described with reference to FIG. 1. A section of truck body 11 is shown supporting a tie-down mechanism 13 in accord with the present invention. The tie-down mechanism 13 sits atop a locking plate 15 which enables the tie-down mechanism 13 to pivot to a limited extent. The extent of pivot is limited by a stop pin 17 which extends vertically upward from the locking plate 15.

The locking plate 15 has an extended portion 19 which carries an aperture (better seen in FIG. 2) through which a locking pin 21 extends. The locking pin 21 has an enlarged head portion which prevents it passing through the locking plate 15, and a downwardly extending portion which also extends below the upper surface level of the section of truck body 11. Alternatively, an aperture may be provided in the truck body portion 11 matching an aperture in the locking plate 15 to even more rigidly secure the locking plate 15 in place.

At the bottom of the locking pin 21 a transverse aperture 23 engages a conventional padlock 25. So long as the space immediately below the locking plate 15 cannot be cleared, the locking plate 15 will be limited in its rotational movement about the center of the tie-down mechanism 13. So long as the locking plate 15 is limited in its movement, the tie-down mechanism 13 will be limited in its pivoting movement by the stop pin 17. Since the removal of the tie-down mechanism 13 is by virtue of its pivoting motion about a threaded stud.

The tie-down mechanism 13 has a frame 27 defining a pair of upright supports including a split end support 29 and a locking pin support 31. The split end support 29 has a slot 33 within which pivots a circular support 35 which supports lever 37. The lever 37 not only pivots with respect to the tie-down mechanism 13, but also pivots with respect to its circular support 35 and in an orthogonal direction with respect to the pivot of lever 37 with respect to tie-down mechanism 13.

When lever 37 is shown in an orientation radially extending away from the central axis of the tie-down mechanism 13, the lever 37 moves into one of a number lever engagement accommodation slots 38 formed into one end of a spool 39 supported by the frame 27. It this radial position, both the lever 37, spool 39 and circular support 35 pivot in unison.

Figure 2:
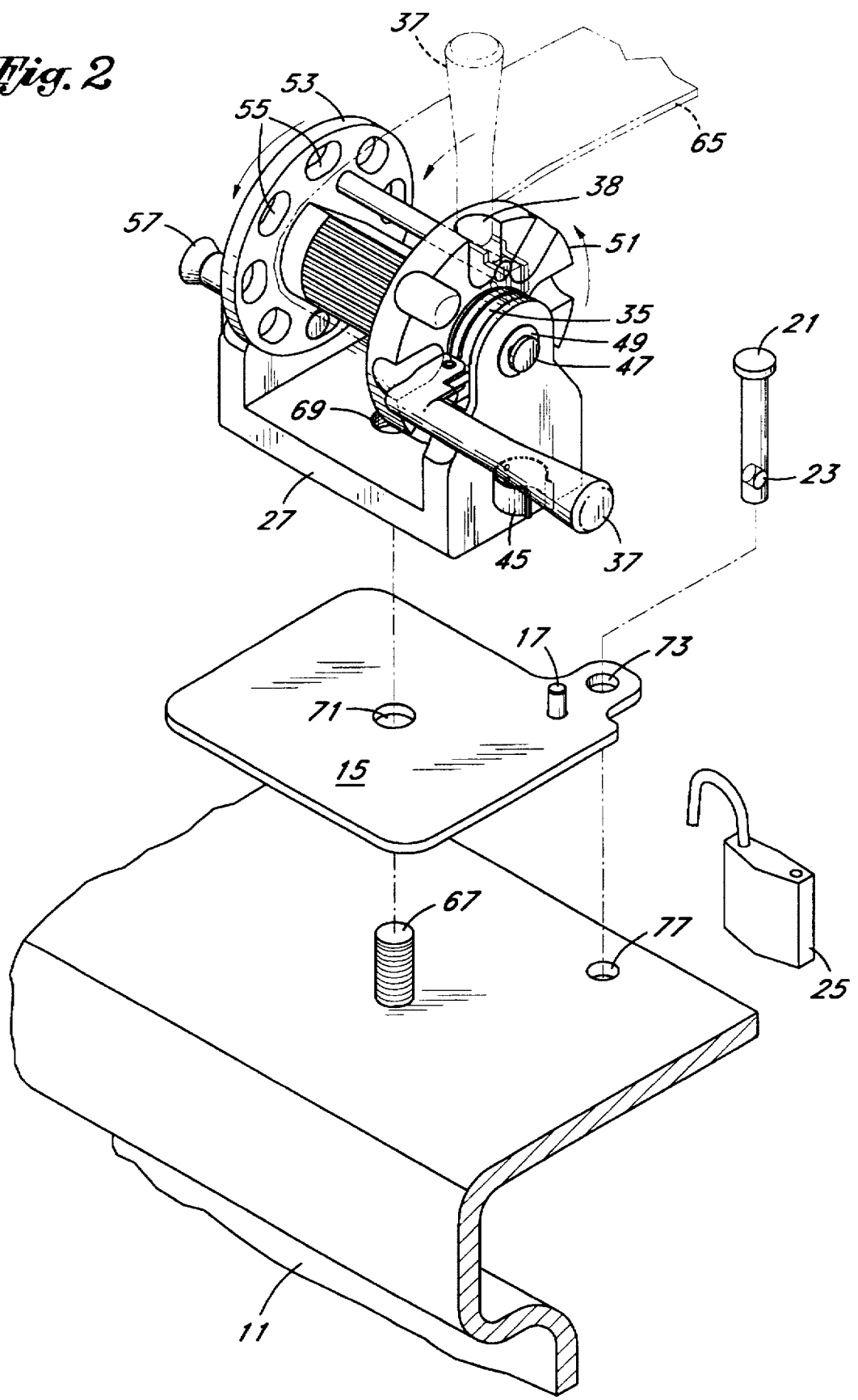
FIG. 2 is an exploded view illustrating the manner of disengagement of the tie-down mechanism of the present invention with respect to the body of a vehicle and illustrating further details of a locking plate.

When lever 37 is pivoted to a second position generally parallel to the length of the spool 39 (as is shown in FIG. 2) the lever 37 is disengaged from any connected movement with the spool 39 and both the spool 39 and lever 37 may move freely and without interference by each other (absent consideration of the locking pin to be discussed).

Note that the specifics of the connection between the circular support 35 and lever 37 includes a tab 41 which is carried by and preferably formed integrally with the circular support 35. The lever 37 has a "U" shaped bracket 43 which surrounds and is pivotally pinned to the tab 41. The bracket 43 and the relationship of the lever 37 to the accommodation slots 38 of the spool 39 limits the movement of the lever 37 between an engaged position shown in FIG. 1 an a secured position where the lever 37 is moved downwardly about 180° and into a rest position where it will be engaged by a holding clip 45. Within holding clip 45 where the lever 37 will rest when the tie-down mechanism 13 is not being operated to either engage nor disengage holding ropes or webbing. This is particularly helpful when the vehicle is moving as it eliminates vibration and noise from movement of the lever 37.

An axle 47, secured by a snap ring 49, is also seen from the perspective of FIG. 1. The axle 47 extends completely through the spool 39 and the split end support 29. The end of the axle 47 shown carries a circular groove to accommodate the snap ring 49. The snap ring 49 prevents the axle 49 from moving back through the frame 27 and disengaging the spool 39, as well as the circular support 35. It is this orientation, however which provides for ease of disassembly and cleaning should the need arise.

Referring to the spool 39, a first end 51 carries the accommodation slots 38, while a second end 53 carries a series of locking apertures 55. The locking apertures 55 are engaged by a spring loaded locking pin having an external portion 57 which is shown as frusto-conically shaped to facilitate manual actuation. A spring inside the structures shown in FIG. 1 acts to move the locking pin into engagement with the ones of the locking apertures 55 which is closest to the end of the locking pin. With this configuration, the spool 39 cannot significantly turn without having the users hand guide the external portion 57 of the locking pin away from the frame 27 to have the locking pin disengage the locking apertures 55.

The middle portion of the spool 39 includes a relatively larger diameter cylindrical portion 59 having a flattened area 61. Over the middle of the flattened area 61 a smaller offset cylindrical portion 63 defines a space between the relatively larger diameter cylindrical portion 59 for threading in and securing a length of webbing. A short length of webbing is illustrated in phantom and identified with the numeral 65. In most cases the tip end of an ordinary piece of webbing 65 can be threaded through the space between the smaller offset cylindrical portion 63 and the relatively larger diameter cylindrical portion 59, and then simply begin turning the spool 39. The webbing 65 will then be turned onto itself, the resulting friction to prevent its slipping away from the spool 39. Even where the length of the end of the webbing threaded through the gap is in excess, it will not harm the operation of the tie-down mechanism 13 if it hangs off in excess. Where a rope or other structure is used, some additional doubling of the length attached to the spool 39 may be necessary to insure a secure attachment to the spool 39.

Referring to FIG. 2, an exploded view more readily illustrates the details of the tie-down mechanism 13 and its associated structures. As can be seen, a threaded post 67 extends upwardly from the section of truck body 11. The threaded stud or post 67 engages a complimentary threaded internal bore 69 in the base of the frame 27. In some instances this threaded internal bore 69 may be provided with the use of a press-fit insert. The post 67 is intended to pass through the locking plate 15 through an aperture 71 provided in the locking plate 15 and previously mentioned.

The central location of both the aperture 71 and the engagement of the post 67 and the threaded internal bore 69 results in an installation where the locking plate 15 is first placed over the post 67 and then where the threaded internal bore 69 is threadably engaged over the post 67 and rotated as it downwardly approaches the locking plate 15. When it comes sufficiently close to the locking plate 15 for the upper end of the stop pin 17 to engage the edge of the frame 27, the locking plate 15 simply pivots or rotates completely about the post 67 until the frame 27 is brought close to the body 11. The frame 27 may be backed off until the frame 27 is in general alignment with the body 11, and an aperture 73 in locking plate 15 is either brought over an edge 75 of the body 11 or is brought over an edge 75, as is shown in FIG. 1, or is brought over a matching aperture 77, which is shown in FIG. 2. Where a matching aperture 77 is present, as by drilling a hole in the upper portion of the body 11, the conventional pad lock 25 will be more out of sight.

When the aperture 77 is present, and when the locking pin 21 is inserted through the aperture 77, the locking plate 15 may not rotate. However, the position of the stop pin 17 is such that the frame 27 will be allowed some rotational displacement from the aligned position shown in FIG. 2. The displacement allowed enables the frame 27 and spool 39 to align with the strapping 65 to enable more efficient and untangled operation of the tie-down mechanism 13. The stop pin 17 limits this movement, and also prevents the theft of the tie-down mechanism 13. Without initial rotation of the locking plate 15 with the tie-down mechanism 13, the tie-down mechanism 13 will never be able to achieve a displacement from the locking plate 15 sufficient to allow the tie-down mechanism 13 to rotate past the stop pin 17 and thus the theft of the tie-down mechanism 13 is prevented.

The lever 37 is shown in two positions in FIG. 2 which are the two positions of operation. Assuming the strap 65 is to be tightened, the lever 37 is first brought to rest in its phantom position, vertically oriented with respect to FIG. 2. In this position, the lever 37 engages one of the accommodation slots 38 of the spool 39. Next the user manually pulls the external portion 57 of the spring loaded locking pin outwardly to disengage the spring loaded locking pin from engagement with locking aperture 55.

The lever 37, while still within the accommodation slot 38, and while the spring loaded locking pin is kept out of engagement with the locking aperture 55, is pivoted downwardly to a horizontal position, moving the spool 39 by 90°, and allowed to lock by the release of the external portion 57 connected to the spring loaded locking pin and the spring loaded locking pin's engagement with a locking aperture 55. The lever 37 is then pivoted with respect to the tab 41 of the circular support 35 to disengage it from the spool 39 while the spool 39 is still locked in position. It is this position which as shown as the solid position of the lever 37 in FIG. 2. The lever 37 is then pivoted about the upwardly. The circular support 35, while the lever 37 is still generally parallel to the length of the spool 39 is rotated upwardly to the position it will occupy in the phantom portion of FIG. 2. Next the lever 37 itself is pivoted upwardly with respect to the tab 41 until it assumes an engaged position in one of the accommodation slots 38 of the first end 51 of the spool 39 as is illustrated in FIG. 2 in phantom. The steps described above are then repeated until the webbing 65 is sufficiently tight.

This same set of steps is performed in reverse order in order to loosen the webbing 65. Only in the reverse order, rather than pulling the lever 37 down, the user applies downward force against the lever 37 to allow it to be eased upward and locked before the lever 37 is re-engaged at a lower position with respect to the spool 39.

Figure 3:
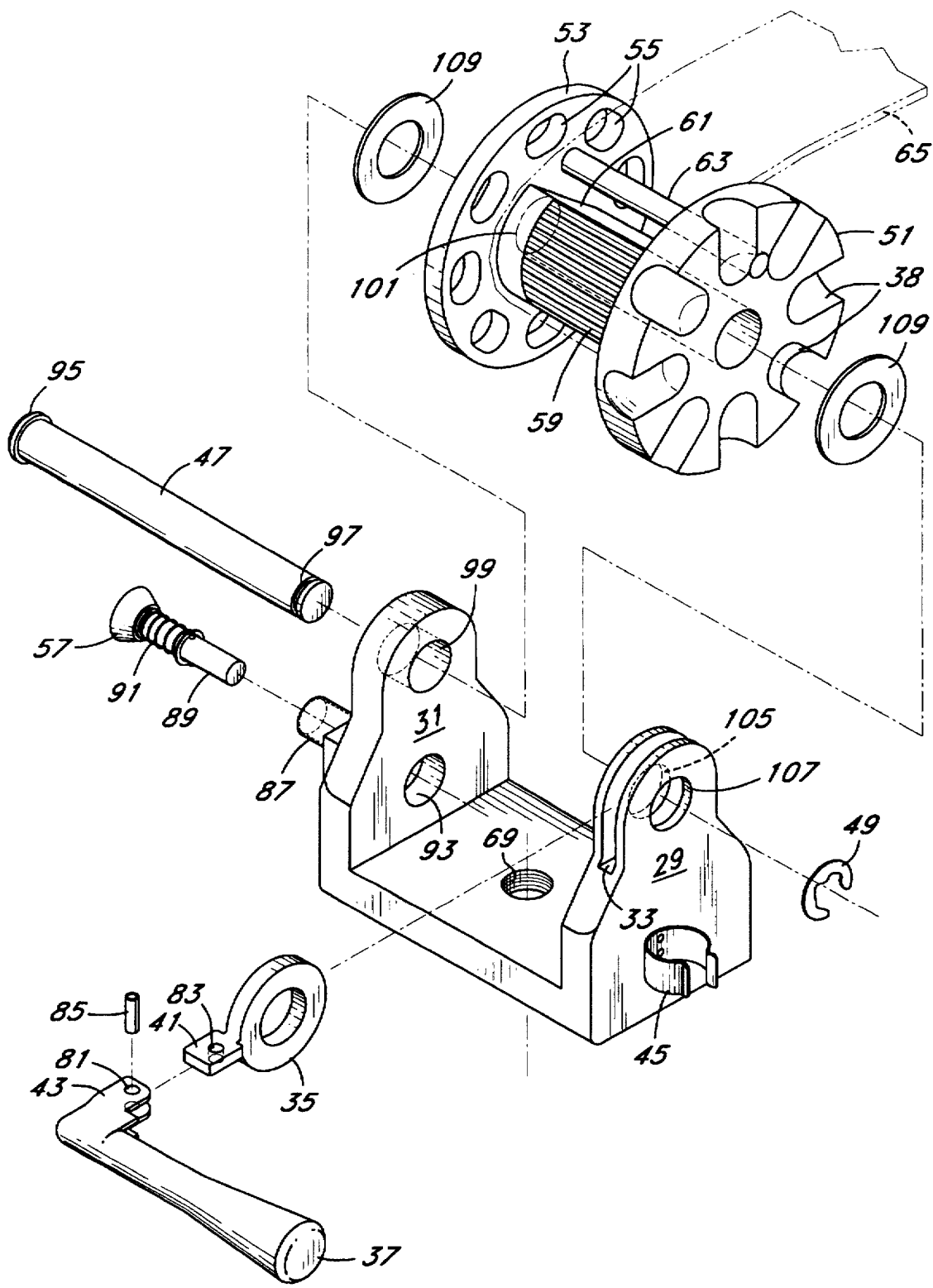
FIG. 3 is an exploded view of the tie-down mechanism itself showing the simplicity of construction and the ease of disassembly.

Referring to FIG. 3, an exploded view of the tie-down mechanism 13 illustrates further details thereof. The bracket 43 has an aperture 81 which can be brought into alignment with an aperture 83 of the tab 41 and secured with a pin 85 to provide pivoting action of the lever 37 with respect to circular support 35.

The frame 27 is shown as having a sleeve 87 into which the spring loaded locking pin 89 fits. The spring loaded locking pin 89 supports a spring 91 between its tip end and the external portion 57. The spring 91 operates by press fitting its end into the internal structures inside a locking pin bore 93 to urge the spring loaded locking pin 89 into the space between the split end support 29 and locking pin support 31.

The axle 47 is shown as having a head 95 at one end and a circular slot 97 to engage snap ring 49. Locking pin support 31 has a bore 99 through which the axle is threaded. Spool 39 has a central bore 101 such that when the spool 39 is in position, the axle 47 passes through the spool and into a pair of matching bores 105 and 107 carried by the split end support 29.

Also shown are a pair of optional structures, washers (preferably nylon) 109. The tolerancing will determine whether the washers 109 will be desirable, since if the spool is closely toleranced between the split end support 29 and locking pin support 31, smooth operation will be assured. However, if the tie-down mechanism 13 is manufactured with relaxed tolerances and in high volume, the washers will eliminate harmful clanging and rubbing between the structures of the tie-down mechanism 13. Where the washers 109 are used, the lateral metal-to-metal rubbing is eliminated leaving the only metal contact between the axle 47 and the spool 39.

Figure 4:
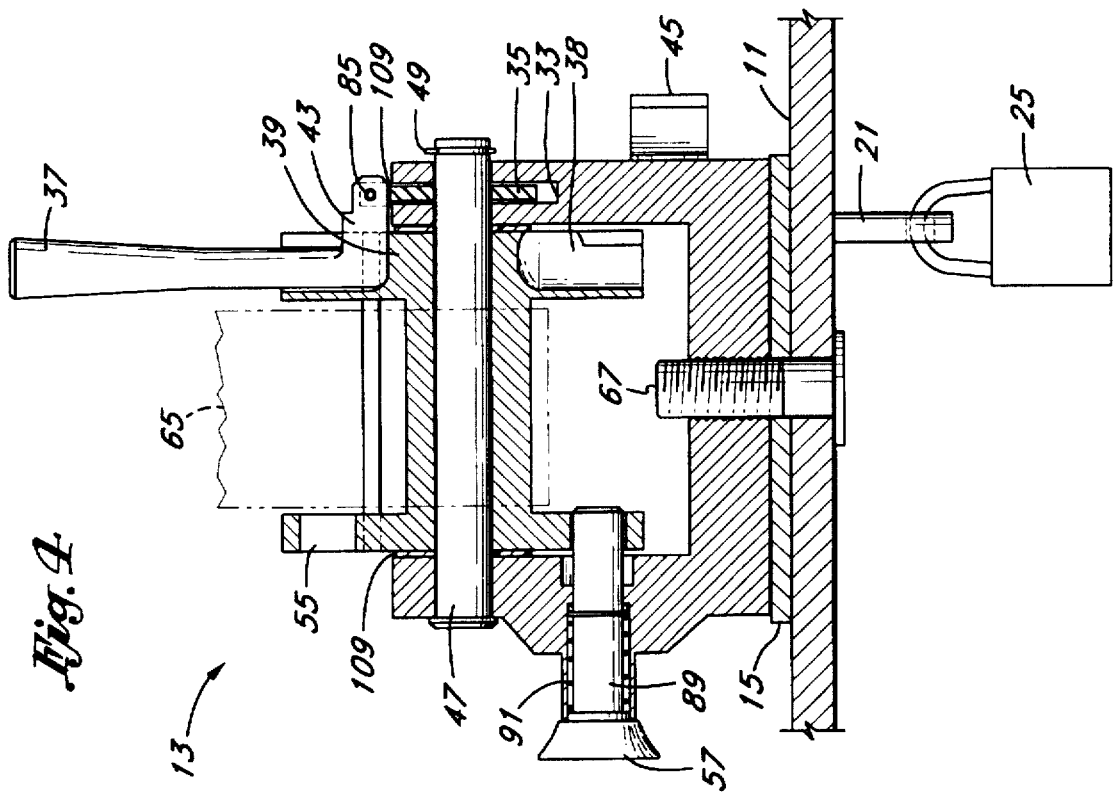
FIG. 4 is a sectional view taken along line 4—4 of FIG. 1.

Referring to FIG. 4, a side sectional view taken along line 4—4 of FIG. 1 illustrates the relationship between the internal parts of the tie-down mechanism 13 when the tie-down mechanism 13 is in assembled form. Shown specifically is the tip end of the spring loaded locking pin 89 engaging a single one of the locking apertures 55. As can be seen from FIG. 4, the axle is held in place by the head 95 and the locking ring 49. The threaded post 67 is shown as being a bolt with a retention head, but any support structure for the threaded post 67 is permissible.

Figure 5:
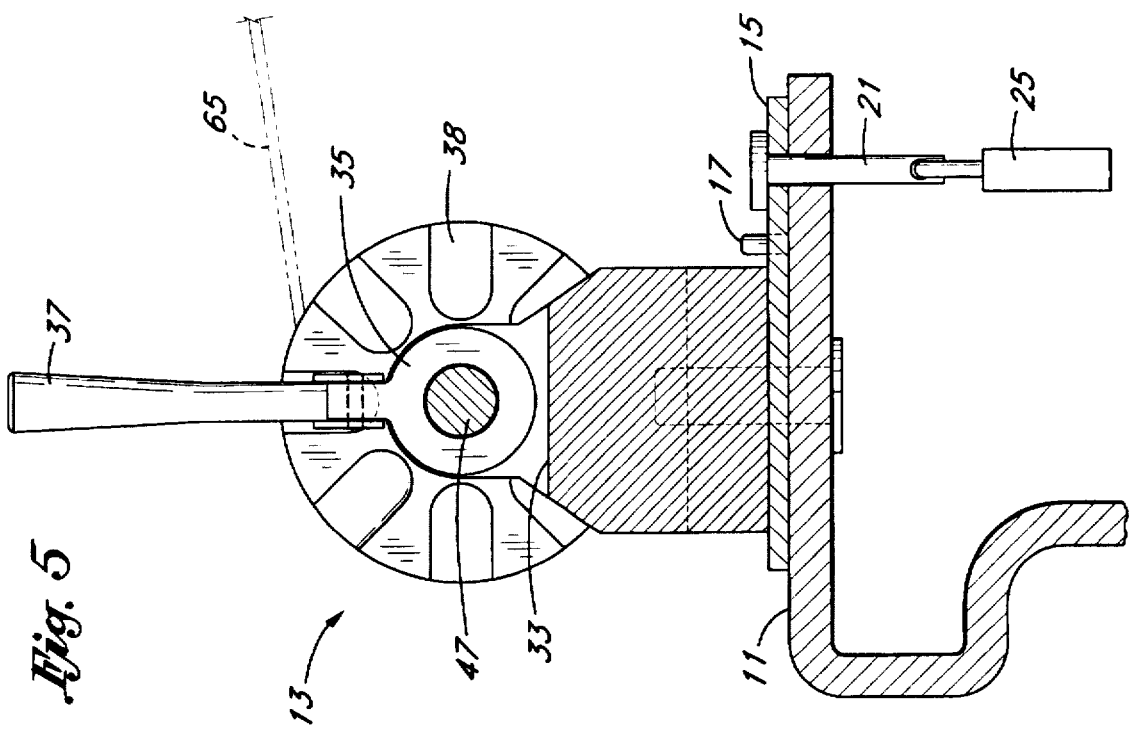
FIG. 5 is a sectional view taken along line 5—5 of FIG. 1.

Referring to FIG. 5, an end sectional view taken along line 5—5 of FIG. 1 takes a view just inside the slot 33 and looking onto the circular support 35. As can be seen from FIG. 4, when the spring loaded locking pin 89 is manually removed from its locking aperture 55, the spool 39 can be turned with the lever 37. The operation of the tie-down mechanism 13 is therefor a two-handed operation where the spool 39 is alternatively locked and then engaged with the lever 37.

While the present invention has been described in terms of a tie-down mechanism support as well as structures for both supporting, securing and preventing the theft of the tie-down mechanism, one skilled in the art will realize that the structure and techniques of the present invention can be applied to many similar devices. The present invention may be applied in any situation where pivoting movement and secure locked support is desired.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A tie-down mechanism comprising:
   a frame having a first end portion having a first axle aperture and a second end portion having a second axle aperture;
   a spool member having a through bore;
   an axle engaging said first axle aperture, said through bore, and said second axle aperture and rotatably supporting said spool member;
   a locking pin supported by one of said first and said second end portions and axially displaceably urged to a position to prevent rotation of said spool member; and
   a pivoting lever selectively engagable with and rotatable with said spool member.

2. The tie-down mechanism of claim 1 wherein said pivoting lever is supported by said axle when not engaged with said spool member.

3. A tie-down mechanism comprising:
   a frame having a first end portion having a first axle aperture and a second end portion having a second axle aperture;

a spool member having a through bore;

an axle engaging said first axle aperture, said through bore, and said second axle aperture and rotatably supporting said spool member;

a locking pin supported by one of said first and said second end portions and axially displaceably urged to a position to prevent rotation of said spool member; and a pivoting lever selectively engagable with and rotatable with said spool member a circular support supported by said axle, and wherein said pivoting lever has a first end pivotally supported by said circular support for supported movement of said lever to a first position where said spool is engaged to pivot with said pivoting lever and to a second position where said spool is disengaged from pivoting with said pivoting lever, and a second end.

4. The tie-down mechanism of claim 3 wherein the other one of said first and said second end portions has a slot and wherein said circular support is carried within said slot.

5. The tie-down mechanism of claim 4 wherein said spool has a first end and a second end and wherein said first end and contains a plurality of radially spaced apart accommodation slots which engage said pivoting lever near said first end of said pivoting lever.

6. The tie-down mechanism of claim 5 wherein said pivoting lever engages one of said plurality of radially spaced apart accommodation slots only when said pivoting lever assumes substantially a right angle with respect to said axle.

7. A tie-down mechanism comprising:

a frame having a first end portion having a first axle aperture and a second end portion having a second axle aperture and wherein said frame carries an internally threaded bore for engagement with a threaded post;

a spool member having a through bore;

an axle engaging said first axle aperture, said through bore, and said second axle aperture and rotatably supporting said spool member;

a locking pin supported by one of said first and said second end portions and axially displaceably urged to a position to prevent rotation of said spool member; and a pivoting lever selectively engagable with and rotatable with said spool member;

a locking plate having a central aperture larger than said internally threaded bore of said frame and having a locking pin aperture, and having a stop pin 17 extending normal to a surface of said locking plate;

a second locking pin having a shaft having a first end having a head and second end, and having a transverse aperture located nearer said second end, said second locking pin to prevent a complete rotation of said locking plate when said second locking pin extends through said locking pin aperture and when said central aperture is mounted about said threaded post when said locking plate is urged against a surface by axial pressure from said frame.

8. The tie-down mechanism of claim 7 and further comprising a holding clip supported by one of said first and said second end portions for securing said pivoting lever.

9. The tie-down mechanism of claim 5 and wherein said second end of said spool carries a plurality of radially spaced locking apertures which align with said locking pin as said spool rotates with respect to said frame.

10. The tie-down mechanism of claim 9 and wherein said locking pin supported by one of said first and said second end portions has a spring engaging an internal surface of its associated end portion urging it into axial engagement with one of said radially spaced locking apertures unless manually withdrawn from engagement with said locking aperture.

* * * * *